(12) United States Patent
Decker et al.

(10) Patent No.: US 11,036,278 B2
(45) Date of Patent: Jun. 15, 2021

(54) BROWSER-DRIVEN POWER SAVING

(71) Applicant: Apple Inc., Cupertino, CA (US)

(72) Inventors: Kevin W. Decker, San Jose, CA (US); Dean Jackson, Holt (AU); Gavin Barraclough, Sunnyvale, CA (US); Jon Lee, San Francisco, CA (US); Craig Federighi, Los Altos Hills, CA (US); Maciej Stachowiak, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/237,361

(22) Filed: Dec. 31, 2018

(65) Prior Publication Data
US 2019/0138077 A1 May 9, 2019

Related U.S. Application Data

(63) Continuation of application No. 14/298,801, filed on Jun. 6, 2014, now Pat. No. 10,209,760.

(60) Provisional application No. 61/832,951, filed on Jun. 9, 2013.

(51) Int. Cl.
| | | |
|---|---|---|
| G06F 1/32 | (2019.01) | |
| G06F 1/3246 | (2019.01) | |
| G06F 1/3206 | (2019.01) | |
| G06F 1/329 | (2019.01) | |
| G06F 16/957 | (2019.01) | |

(52) U.S. Cl.
CPC .......... *G06F 1/3246* (2013.01); *G06F 1/3206* (2013.01); *G06F 1/329* (2013.01); *G06F 16/9577* (2019.01); *Y02D 10/00* (2018.01)

(58) Field of Classification Search
CPC ..... G06F 1/32; G06F 1/26; G06F 1/28; G06F 9/44
See application file for complete search history.

(56) References Cited

U.S. PATENT DOCUMENTS

| | | |
|---|---|---|
| 7,000,126 B2 | 2/2006 | Stanley |
| 8,370,518 B2 | 2/2013 | Chen et al. |
| 8,448,090 B2 | 5/2013 | Van Der Meulen et al. |

(Continued)

FOREIGN PATENT DOCUMENTS

| | | |
|---|---|---|
| CN | 101627357 A1 | 1/2010 |
| CN | 102667664 A1 | 9/2012 |

(Continued)

OTHER PUBLICATIONS

Office Action Search Report for CN Appl. No. 2014800327308 dated Feb. 2, 2018.

(Continued)

*Primary Examiner* — Keshab R Pandey
(74) *Attorney, Agent, or Firm* — Fernando & Partners, LLP

(57) ABSTRACT

The embodiments disclosed herein describe ways that a browser application or other process can reduce power usage by a computing device. Methods include the process suspending one or more plug-ins on a web page by replacing them with a snapshot taken from the plug-in, and reducing processing on non-media plug-ins and non-visible portions of web pages running in the browser, but not currently in focus, such as when a tab is in the background behind a different tab, when a browser window is minimized, or when the web page is entirely or partially occluded.

22 Claims, 12 Drawing Sheets

(56) References Cited

U.S. PATENT DOCUMENTS

| | | | |
|---|---|---|---|
| 9,003,310 B2* | 4/2015 | Johansson | G06F 9/46 715/760 |
| 9,501,460 B1* | 11/2016 | Battre | G06F 40/166 |
| 2002/0040388 A1 | 4/2002 | Ternullo et al. | |
| 2002/0175935 A1 | 11/2002 | Wang et al. | |
| 2003/0009495 A1 | 1/2003 | Adjaoute | |
| 2005/0228849 A1 | 10/2005 | Zhang | |
| 2008/0077901 A1 | 3/2008 | Arsintescu | |
| 2008/0276248 A1* | 11/2008 | Xu | G06F 9/451 719/313 |
| 2008/0303828 A1* | 12/2008 | Marchant | G06T 13/00 345/473 |
| 2011/0022984 A1 | 1/2011 | Van Der Meulen et al. | |
| 2011/0088039 A1* | 4/2011 | Tabone | G06F 16/137 718/104 |
| 2012/0246570 A1 | 9/2012 | DeLuca et al. | |
| 2013/0027408 A1* | 1/2013 | Garg | G06F 16/9577 345/473 |
| 2013/0084000 A1 | 4/2013 | Bhardwaj et al. | |
| 2013/0119386 A1 | 5/2013 | Huang et al. | |
| 2014/0229268 A1* | 8/2014 | Clapp | G06Q 30/0242 705/14.41 |
| 2015/0222512 A1* | 8/2015 | Kay | G06F 11/3003 709/224 |

FOREIGN PATENT DOCUMENTS

| | | |
|---|---|---|
| EP | 2575056 A1 | 4/2013 |
| WO | 2011123859 A1 | 10/2011 |

OTHER PUBLICATIONS

International Search Report and Written Opinion for International Application No. PCT/US2014/041428, dated Dec. 19, 2017, 17 pages.

Office Action for Chinese Application No. 2014800327308 dated Dec. 26, 2019.

Guo et al., "In-Game Advertising Integration Technology Based on Function Interception", Computer applications and software, vol. 29, issue 1, 14 pages (Abstract Only).

\* cited by examiner

BROWSER-DRIVEN POWER SAVING

RELATED APPLICATIONS

This case claims the benefit of U.S. patent application Ser. No. 14/298,801, filed Jun. 6, 2014, titled "Browser-Driven Power Saving," which itself claims the benefit of U.S. Patent Application Ser. No. 61/832,951, filed Jun. 9, 2013, titled "Browser-Driven Power Saving," both of which are incorporated by reference in their entirety.

BACKGROUND

The embodiments generally relate to a process (e.g., a browser application) that modifies processing of content on a web page to capture power savings and extend battery life. More particularly, the embodiments relate to suspending plug-ins on a web page and reducing web pages processing associated with web pages that are not in focus.

Many web pages include one or more plug-ins to present content. A plug-in generally provides additional functionality to the process that is managing the power (e.g., the web browser), for example to access additional content that some circumstances is present on a web page. A plug-in optionally is related to the main resource for the page, such as a music video for a video website or a video news report for a news website, or alternatively related to non-central elements such as advertisements and other content. In addition, even the primary content of web pages has become more processing intensive.

SUMMARY

However, the increased presence of plug-ins on web pages requires increased processor utilization, which in turn requires increased power consumption, such as battery power. When a plug-in on a web page is related to the main resource of the page, this power usage is necessary and likely is related to the content for which the user sought out the page. For plug-ins that are not part of the main resource, such as advertisements, the power usage, often comes at the expense of content the user did not seek out, or even content that in some circumstances is distracting to the user. In addition, much of the processing that occurs for a web page continues even when the page content is no longer being actively read by the user, such as when the user has minimized the browser window, occluded the web page with another application, or moved the web page to a background tab of the browser. This is because in some browsers, the plug-in continues to execute under these rules, resulting in continued battery power consumption. Since many users access web content using mobile, battery-powered devices, the reduction of battery power due to plug-in execution results in the need for more frequent recharging and thus excessive energy consumption.

Some browsers do not provide a means for recognizing the aspects of web pages that are causing excessive power and battery usage relative to their usefulness to the user, nor a means for reducing such power usage as a way to extend battery life for the associated computing device.

A process (e.g., a browser application) is configured to perform various methods that reduce power usage by a computing device, selectively based on the status of processes that the browser application controls. The methods include replacing the processing-intensive plug-in activity associated with displaying a video, with a static image that is a snapshot taken from the video. In this embodiment, the process (e.g., browser) parses a received web page to identify one or more media plug-ins on the page, and applies a set of rules to the media plug-ins to determine whether to apply a power saving procedure to one or more of them. If the power saving procedure is to be applied, snapshots images are captured from the plug-in, and an appropriate one of the images is selected to replace the plug-in on the page. The presentation of a static image does not require the continuous use of the processor as would executing the plug-in to display a video, thereby reducing the processing power that would otherwise result from allowing the plug-in to run. A user can subsequently reload the plug-in by clicking or otherwise activating it.

In addition, power saving methods include suspending or reducing non-media plug-in execution on any page and other processing on non-visible portions of pages running in the browser, but not currently in focus, such as when a tab is in the background behind a different tab, when a browser window is minimized, or when the web page is entirely or partially occluded by another window. In this embodiment, the process determines web pages open within the browser, as well as whether the content of the open pages is visible (as opposed to occluded, minimized, in a background tab, or otherwise not visible), and suspends or reduces update associated with pages with non-visible content. The process works with timers for the page content to reduce processing power and thus saves battery/power, and also coordinates with any power usage reduction already being implemented by the operating system for browser processes.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and was not selected to circumscribe the inventive subject matter.

Figure 1:
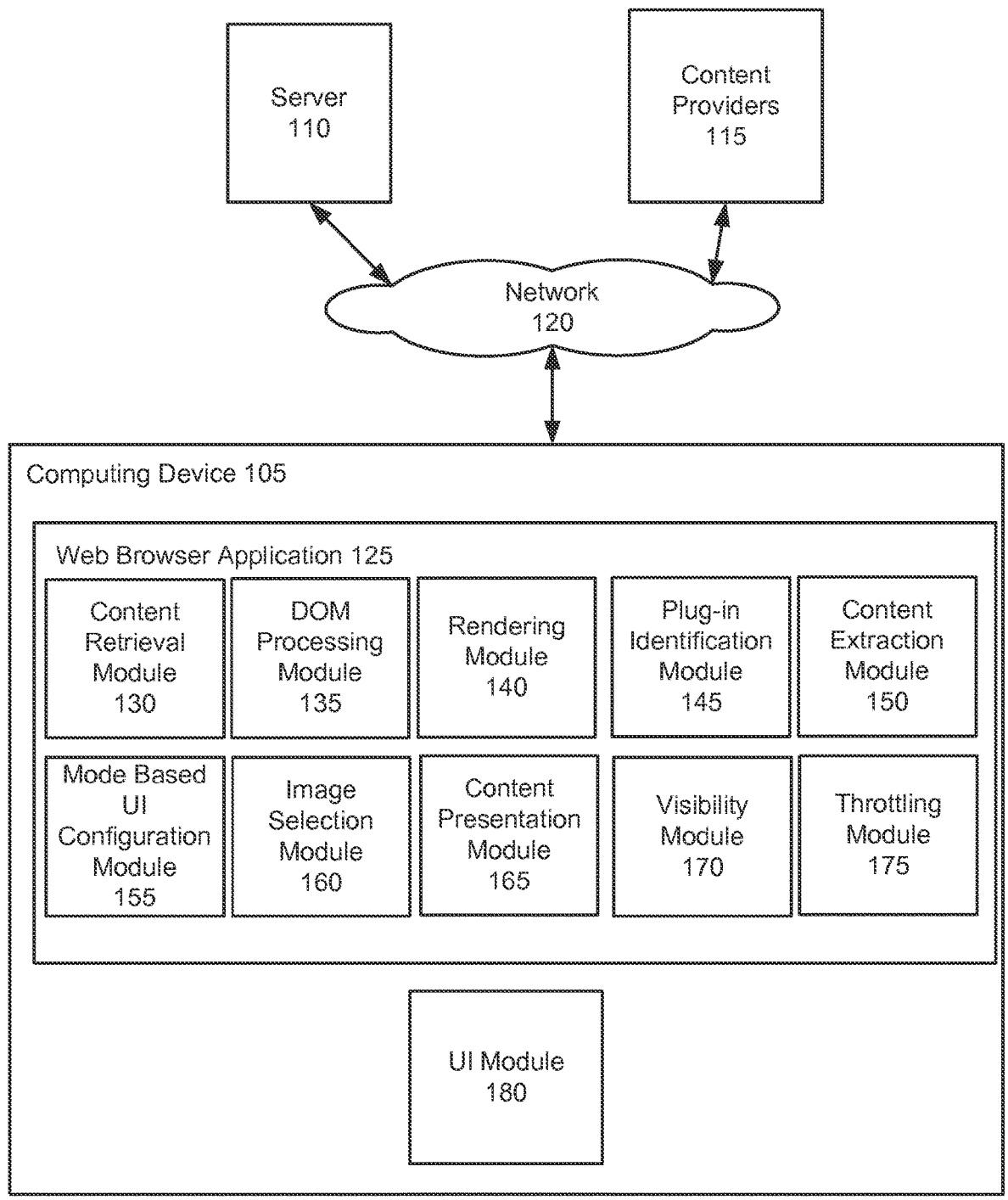
FIG. 1 is a high-level block diagram of a computing environment for invoking power saving procedures via a browser or process according to one embodiment.

The figures depict, and the detail description describes, various non-limiting embodiments for purposes of illustration only. One skilled in the art will readily recognize from the following discussion that alternative embodiments of the structures and methods illustrated herein in some circumstances are employed without departing from the principles described herein.

DETAILED DESCRIPTION

Methods and apparatuses for reducing power usage by a browser application or process are described herein. In the following description, numerous specific details are set forth to provide thorough explanation of embodiments of the present invention. It will be apparent, however, to one skilled in the art, that embodiments of the present invention in some circumstances are practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment. References to entities in the singular should be understood to encompass the plural, as appropriate for the context.

The processes depicted in the figures that follow are performed by processing logic that includes hardware (e.g., circuitry, dedicated logic, etc.), software (such as is run on a general-purpose computer system or a dedicated machine), or a combination of both. Although the processes are described below in terms of some sequential operations, it should be appreciated that some of the operations described optionally are performed in different order. Moreover, some operations are performed in parallel rather than sequentially in some circumstances.

According to one embodiment, a process (e.g., browser) parses a received web page to identify one or more media plug-ins on the page, and applies a set of rules to the media plug-ins to determine whether to apply a power saving procedure to one or more of them. If the power saving procedure is to be applied, snapshots images are captured from the plug-in, and an appropriate one of the images is selected to replace the plug-in on the page, thereby saving the processing power associated with allowing the media plug-in to run. A user can subsequently reload the media plug-in by clicking or otherwise activating it. The processes discussed herein pertain to media plug-ins, such as those including video, audio, or some combination including video or other visual components. While some aspects described apply to the specific visual components (e.g., capturing a snapshot), other aspects described herein are more generally applicable to plug-in types without a visual component (e.g., reduced updating, suspending, etc.).

According to another embodiment, a browser or process determines web pages open within the browser, as well as whether the content of the open pages is visible (as opposed to occluded, minimized, in a background tab, or otherwise not visible), and suspends or reduces update rates associated with pages with non-visible content. As used herein, the term occluded means blocked, hidden, or otherwise concealed at least in part by another UI object. The browser or process works with timers for the page content to reduce processing power and thus save battery/power, and also coordinates with throttling of processes by the operating system. This process also can be applied as the power saving step for plug-ins that do not include visual content.

System Environment

FIG. 1 is a high-level block diagram of a computing environment 100 for controlling power saving by a browser or other process managing the power in a web browser application, according to one embodiment. Although the example herein recites a web browser performing the methods described, any other process also could be performing the method in conjunction with information from the browser. The system 100 includes one or more computing devices 105, one or more servers 110, one or more content providers 115, and a network 120.

In one embodiment, the content provider 115 provides articles such as web pages to the computing device 105. The term 'articles,' as used herein, is used in the general sense to refer to documents, web pages, and other content. A web site is an example of a content provider 115. Although a single content provider 115 is shown in FIG. 1, multiple content providers are in communication with the computing device 105 in some circumstances.

The computing device 105 is an electronic device such as a desktop computer (e.g., an iMac™), a laptop computer (e.g., MacBook™), a tablet computer (e.g., iPad™), a mobile phone (e.g., iPhone™), a media device (e.g., iPod™), etc., each from Apple Inc. Generally, the computing device 105 is configured to enable a user to view articles provided by the content provider 115 or server 110. The server 110 is any computing device or a cloud server, such as iCloud™, and in some circumstances is a general purpose computer or server-level computer as described in conjunction with FIG. 2. The network 120 includes in various embodiments any combination of local area and/or wide area networks, using both wired and wireless communication systems.

The computing device 105 includes a web browser application 125, such as Safari® from Apple Inc. or Internet Explorer® from Microsoft Corporation. The web browser application 125 has multiple modules: content retrieval module 130, DOM processing module 135, rendering module 140, plug-in identification module 145, content extraction module 150, mode based UI configuration module 155, image selection module 160, content presentation module 165, visibility module 170, and throttling module 175.

As is known in the art, the term "module" refers to computer program logic utilized to provide the specified functionality to the computing device 105. Other embodiments of the process that is managing the power (e.g., the web browser 125) and/or computing device 105 can have different and/or other modules than the ones described here, and that the functionalities can be distributed among the modules in a different manner.

Content retrieval module 130 is configured to retrieve articles (i.e., documents, web pages, and other content) via a network 130 from a remote server 110 or other content provider 115 or a local file system, and is one means for performing this function. Documents received can be hypertext based, such as HTML (Hyper Text Markup Language), XML (Extensible Markup Language), or other markup languages, as well as CSS (Cascading Style Sheets), JavaScript, and any other page presentation or control mechanisms.

In one embodiment, DOM processing module 135 can process (i.e., parse) a document to identify document elements and generate a document object model (DOM) tree out of the document elements, and is one means for performing this function. A document element in some circumstances is a hypertext element such as an HTML tag in an HTML document. A DOM tree represents a topological or structural relationship among the document elements in some circumstances. Nodes in a DOM tree of a document correspond to one document element of the document. Document elements optionally include document content and/or layout specifications, such as size attributes associated with HTML tags in an HTML document, for presenting the document content. Rendering module 140 in some circumstances generates rendering information, such as layout parameters (e.g., sizing data of a rectangular area) for nodes in a DOM tree for presenting a corresponding document. Rendering module 140 can make rendering decisions according to configurations including layout specifications in a document, user interface settings for the process that is managing the power (e.g., the web browser 125) and/or other system settings, etc. A web page optionally is represented by a rendered DOM tree via rendering module 140. In one embodiment, rendering module 140 is the WebKit layout engine, which allows processes (e.g., web browsers) to render web pages.

In one embodiment, plug-in identification module 145 can determine if a document includes one or more plug-ins, and is one means for performing this function. Typically, browser application 125 can present a document received according to an original rendered DOM tree directly from DOM processing module 135 and rendering module 140. If the document includes plug-ins, plug-in is represented in the DOM based on a specific ClassID, element type, or file extension (suffix) known to correspond to a media plug-in, which can be identified as described below in conjunction with FIG. 3 (step 315).

A special mode is triggered for the document by plug-in identification module 145. A special mode optionally includes document independent user interface configurations, such as designating multiple target areas on a display screen for presentation. Plug-in identification module 145 retrieves metadata via links obtained from a DOM tree as embedded in a document to further process the document and retrieve remote content in some circumstances. If a document is associated with a special mode, in one embodiment, content extraction module 150 can select, e.g., heuristically, targeted content to present from the document, e.g., plug-ins, according to the special mode. Content extraction module 150 optionally clones sub trees selected from an original DOM tree for a mode specific DOM tree representing the plug-ins from the document, to present in a separate process from the displayed page that is not visible to the user, for running the power saving procedure described in conjunction with FIGS. 3 and 6 herein.

Mode based UI configuration module 155 can configure the separate process for the special mode identified for a document, and is one means for performing this function. In one embodiment, content extraction module 150 provide mode based UI configuration module 155 configuration parameters and/or content sources extracted from a rendered DOM tree for the document. Mode based UI configuration module 155 optionally configures the separate process created by content extraction module 150 for rendering off screen.

Image selection module 160 provides processing for selection of an appropriate replacement image for a plug-in, and is one means for performing this function. One implementation of module 160 is described in conjunction with FIG. 6. Content presentation module 165 can present a rendered DOM tree, e.g. based on a document associated with a regular mode or selected content from a document in a special mode.

Visibility module 170 provides the browser 125 (or process) the ability to determine which pages and content are visible via the user interface, e.g., by identifying background tabs, minimized windows, and occluded content as non-visible, and is one means for performing this function. One implementation of module 170 is described in conjunction with FIG. 8.

Throttling module 175 determines what content is being power throttled by the operating system, determines what content should have further power reduction applied based on its visibility status, communicates throttling messages to the operating system for throttling entire processes, and works with timers to apply throttling at the browser 125 level, and is one means for performing these functions.

Figure 4:
FIG. 4 displays an example graphical user interface (GUI) of a browser displaying a CNN web page according to one embodiment.
Figure 5A:
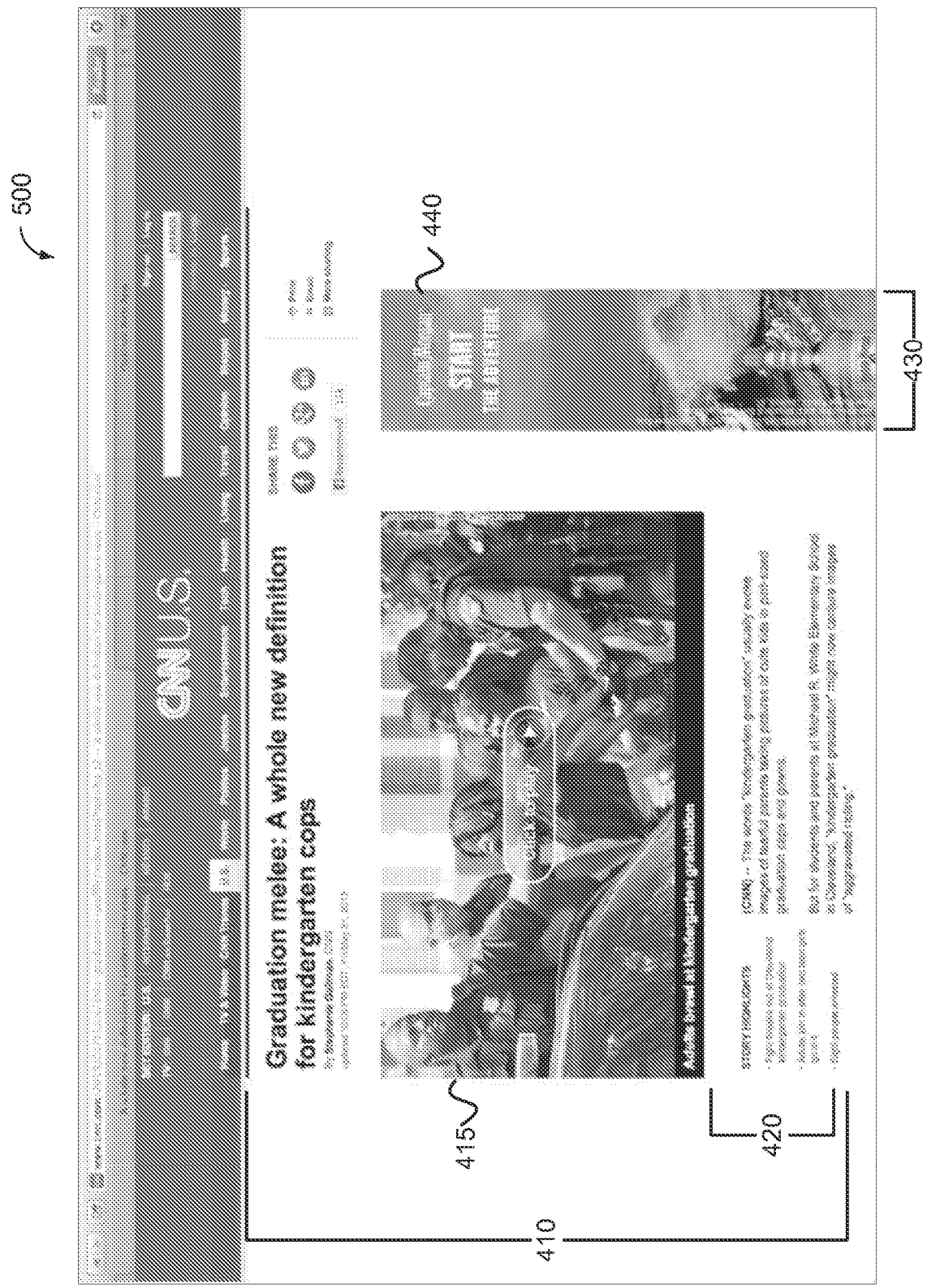
FIGS. 5A and 5B display examples of GUIs in which a plug-in has been replaced by a still image according to one embodiment.

Computing device 105 also includes a UI module 180 that controls presentation of graphical user interface aspects on the display, for example, for providing the user interfaces of FIGS. 4, 5A/B, 7, and 9-11.

Figure 2:
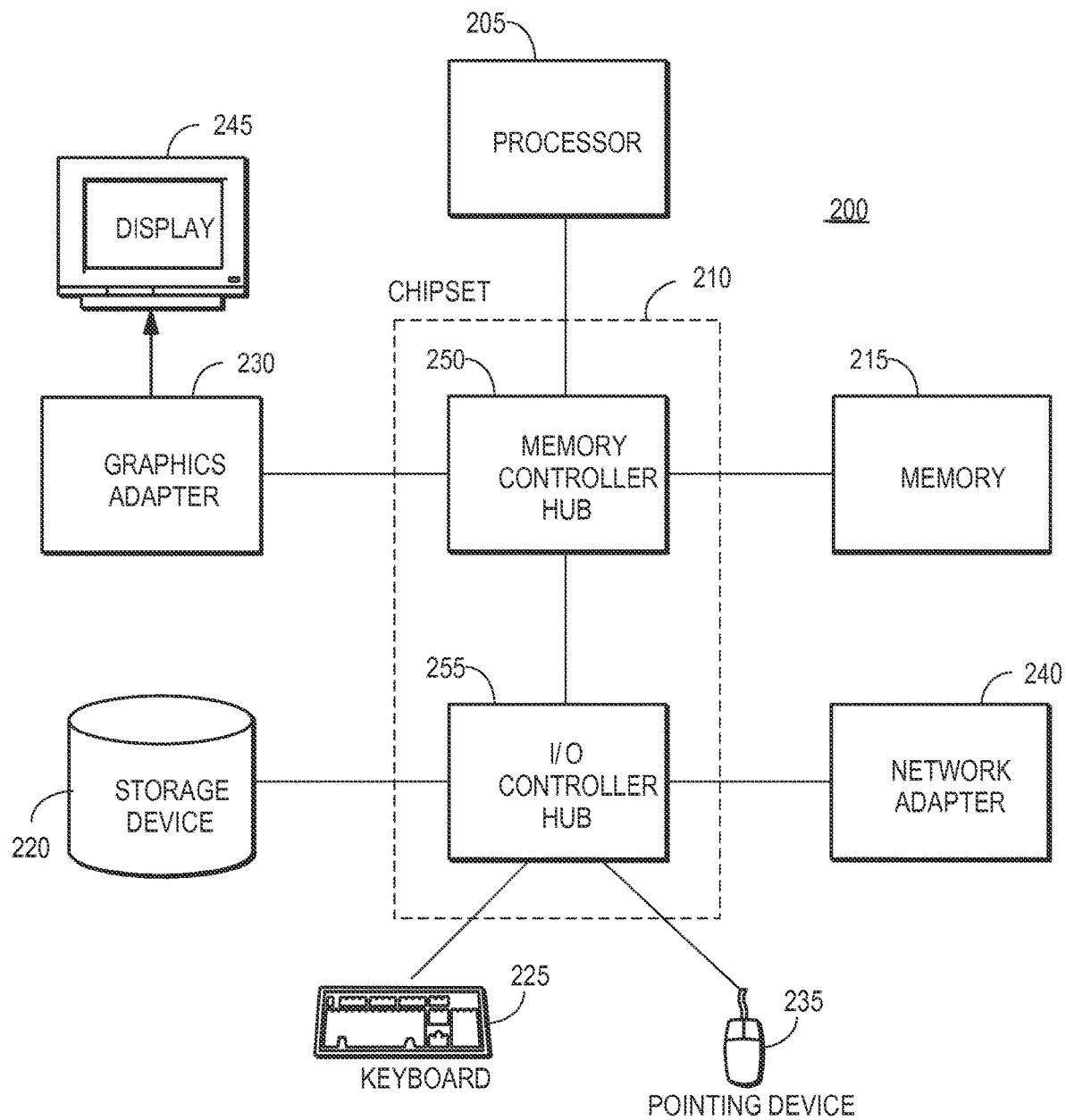
FIG. 2 is a high-level block diagram illustrating a typical computer for acting as the computing device and/or cloud server according to one embodiment.

FIG. 2 is a high-level block diagram of a computer 200 for acting as the computing device 105 or server 110 according to one embodiment. Illustrated are at least one processor 205 coupled to a chipset 210. Also coupled to the chipset 210 are a memory 215, a storage device 220, a keyboard 225, a graphics adapter 230, a pointing device 235, and a network adapter 240. A display 245 is coupled to the graphics adapter 230. In one embodiment, the functionality of the chipset 210 is provided by a memory controller hub 250 and an I/O controller hub 255. In another embodiment, the memory 215 is coupled directly to the processor 205 instead of the chipset 210.

The storage device 220 includes a non-transitory computer-readable storage medium, such as a hard drive, compact disk read-only memory (CD-ROM), DVD, or a solid-state memory device. The memory 215 holds instructions and data used by the processor 205. The pointing device 235 is a mouse, track ball, touch panel, or other type of pointing device in various embodiments, and is used alone or in combination with the keyboard 225 to input data into the computer system 200. The terms "click," "hover," "button selection," etc., as used herein to refer to a user action by way of a pointing device 235, means any user-initiated action that effects that end, which includes touch-screen actions such as tapping, double tapping, holding a finger on the touch screen, swiping, pinching, etc., as commonly used on single-touch and multi-touch enabled devices. The graphics adapter 230 displays images and other information on the display 245. The network adapter 240 couples the computer system 200 to a local or wide area network, such as network 120 of FIG. 1.

As is known in the art, a computer 200 can have different and/or other components than those shown in FIG. 2. In addition, the computer 200 can lack certain illustrated components. In one embodiment, a computer 200 acting as the server 110 optional lacks a keyboard 225, pointing device 235, graphics adapter 230, and/or display 245. Moreover, the storage device 220 can be local and/or remote from the computer 200 (such as embodied within a storage area network (SAN)). As is known in the art, the computer 200 is adapted to execute computer program modules for providing functionality as described herein. In one embodiment, program modules are stored on the storage device 220, loaded into the memory 215, and executed by the processor 205.

Method Flow: Power Saver Procedure

The methods and systems described herein describe ways that a browser application or process can reduce power usage by a computing device, based on the processes that the browser application or process controls. The methods include the browser (or ther process) suspending one or more plug-ins on a page that are not the primary resource, and by replacing the processing-intense plug-in activity with a static image that is a snapshot taken from the plug-in. In addition, additional methods include reducing processing on non-visible portions of pages running in the browser, but not currently in focus, such as when a tab is in the background behind a different tab, when a browser window is minimized, or when the web page is entirely or partially occluded.

Figure 3:
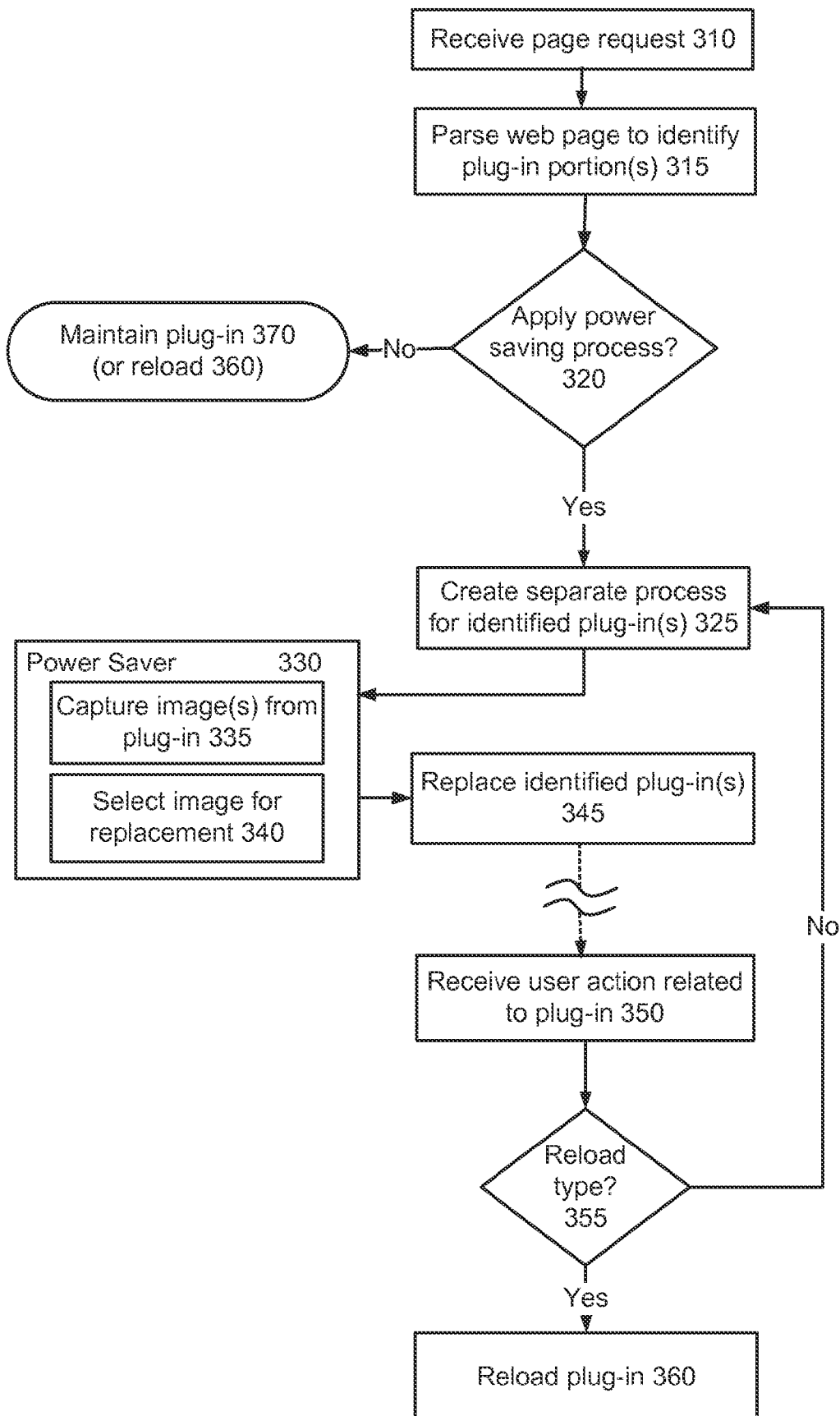
FIG. 3 is a flowchart depicting a method for saving power within a browser or process according to one embodiment.

FIG. 3 is a flowchart depicting one method for saving power, this method is, optionally performed by computing device 105 (e.g., browser 125) or one or more programs stored in a non-transitory computer-readable storage medium therein. In some circumstances, browser 125 receives 310 a page request from a user, e.g. by selection of a hyperlink, a bookmark, or entry of a URL. The requested page is retrieved from a local or remote server, e.g., by content retrieval module 130.

Next, browser 125 (or process) parses 315 the web page to identify one or more plug-in portions. Specifically, from the page retrieved, resources are processed, e.g., by DOM processing module 135, to determine the main resource, additional resources (such as advertisements or multimedia content from a separate content server, etc.) to fetch, etc., and details are recorded regarding the various resources and their respective content sources. During this process, one or more plug-in applications are identified, e.g., by plug-in identification module 145, based on a DOM tree rendered, e.g., by rendering module 140. For example, if the page includes a link with a file extension (suffix) indicating a media plug-in file type (e.g., .swf, .wmv, .tivo, .rmd, .mpv2, .gvi—to name just a few), then the page includes a media plug-in. Similarly, if the page includes elements typically associated with media plug-ins (e.g., <object>, <embed>, <video>, <audio>, <source>, etc.—to name a few), the browser 125 (or process) knows there could be a media plug-in on the page. Although it is possible to identify multiple plug-ins via this parsing 315 process, the remainder of this figure description references a single plug-in. The singular usage is for clarity here and is not meant to be limiting; the processes described below (steps 320-370) optionally are repeated for multiple plug-ins that appear on a page.

In one embodiment, the computing device 105 displays a web page in the web browser application 125. FIG. 4 illustrates a graphical user interface (GUI) for a browser 125 displaying a CNN web page 400, e.g., a provided by user interface module 180. The web page 400 has a main resource section 410 in the middle of the page 400, which includes a video plug-in 415 and text content 420, as well as a side portion 430, which also includes a plug-in 435. Plug-in 435 is an advertisement. The plug-ins 415,435 despite being shown here with play buttons, typically would be automatically launched and thus playing a video or other animation. A playback control bar is shown at the bottom right of the video of plug-in 415, however, such a control bar is optional and not present in some plug-in formats. The parsing step of FIG. 3 would identify both plug-ins 415 and 435.

Returning to FIG. 3, browser 125 (or other process) then determines 320 which set of rules apply to the identified plug-in. The set of rules are affirmative according to one embodiment, e.g., that the source of the plug-in appears on a user-specific or browser-based blacklist of plug-ins to subject to the power saver procedure. For example, a blacklist is maintained by the browser (or process) for known advertisement server sources in some circumstances. Another affirmative rule that applies in some circumstances is that the plug-in is determined to use an amount of power exceeding a maximum power usage threshold. In this rule, power usage by the plug-in is sampled over the course of a defined period to determine if power usage exceeds a threshold defined as the maximum power usage allowed, above which a power saving procedure is applied. Power usage is based on CPU utilization by the plug-in. For example, the browser 125 (or process) can check CPU usage once a minute, determination a measure of utilization attributable to the plug-in (e.g., percentage of CPU cycles used by the plug-in, or percentage of CPU time), and can apply the power saving procedure if an amount of time, t, has passed, during which no user action is taken related to the plug-in.

The set of rules optionally includes exclusionary or negative rules. For example, the set of rules optionally includes that the plug-in is not the main resource for the web page (e.g., as determined above in the parsing step 315). This is because some web pages are designed so that nearly the entire page content is a single Flash video plug-in; in which case this rule would be helpful to recognize the Flash video plug-in as the main resource (rather than as an advertisement) and not suspend the plug-in. In this situation, browser 125 (or process) will not apply the power saver procedure because the plug-in likely is the content that the user was trying to access via the web page. The ability to recognize content as the main resource for a web page is further described in U.S. patent application Ser. No. 12/794,674, entitled "Reader Mode Presentation of Web Content," filed Jun. 4, 2010, which is incorporated by reference herein in its entirety.

Another example of an exclusionary rule is that the plug-in does not exceed a maximum size threshold, or is not smaller than a minimum size threshold; these thresholds are predetermined or adjustable by browser 125 (or process) in some circumstances. These examples are rules in which the plug-in is audio only (e.g., size zero or very small size), in which case it makes sense to let the plug-in continue to run, or due to small size it uses little power/battery life. An optional predetermined size minimum is used in some circumstances, such as a size below a minimum width and/or height (e.g., 40 pixels), or a total size, e.g., 40×40 pixels, or minimum percentage of the pixel area of the page (e.g., less than 5%). Conversely, very large plug-ins sometimes indicate that they are part of the primary content, even if not identified as such by the 'not main resource' negative rule. Again a predetermined size, e.g., as a percentage of the page optionally is used, for example if the plug-in takes up 94% of the total page or more it is considered large, and thus the power saving procedure is not initiated.

Another example of an exclusionary rule is that the plug-in is not from a source included on a user-specific or browser-based whitelist of sources (e.g., source as determined above in the parsing step 315). A browser-based whitelist is be maintained for common video sites, such as YouTube, Vimeo, etc. in some circumstances. User-based whitelists optionally are generated, e.g., when a user clicks on a plug-in from a particular source thereby interacting with the plug-in, the source information is automatically added to a whitelist of sources, which is maintained by the browser 125 (or process) for a predetermined time such as 30 days; the user can edit the user whitelist in a preferences setting to add or remove sources. A clicked-on plug-in is added to the user whitelist as a combination of page URL and plug-in URL. This process restricts the approval of the plug-in to just the page that it appears on, and thus prevents a user who clicks on an advertisement once from unintentionally automatically activating all plug-ins ads from the advertisement provider on every page visited. In addition, a further negative rule optionally is that the plug-in was not loaded in response to a user action. For example, if a user clicks on a button or other user interface element that launches a plug-in, it is likely that the user wanted to run the plug-in and thus this particular instance of the plug-in should not be power saved. This example often occurs for plug-ins associated with games. The browser 125 (or other process) looks at whether the plug-in was lunched as a result of user input (e.g., timestamp of mouse, key, touch), or if a user action occurred within N seconds, e.g., five seconds, before plug-in launch.

If the (positive or negative) rules do not apply, the process managing the power (e.g., browser 125) allows 370 the plug-in to load without applying the power saving procedure 330. If one of the rules do apply, the browser (or process) creates 325 a separate execution process for the identified plug-in, e.g., via content extraction module 150 cloning subtrees for the relevant DOM components, and placing them into the new process, and the mode based UI configuration module 155 then controlling the cloned subtrees so that they are not displayed. The browser (or process) then executes the power saving procedure 330.

Referring again to the example of FIG. 4, the plug-in 415 in the main resource section 410 will be classified as the main resource for the web page, and thus the power saving procedure is not applied to it. However, plug-in 435 would have the power saving procedure applied, as it is not a primary resource (e.g., is not be present on a whitelist, or may even appear on a blacklist of sources since it is an advertisement).

Once the power saver procedure is initiated 330, an amount of power consumed by the plug-in is reduced (e.g., by preventing the plug-in from playing on the web page). Within the separate process, but not visible to the user, one or more images are captured 335 as snapshots from the plug-in for possible use as a static image to replace the plug-in as it appears on the received page. From the image(s) captured, an image is selected 340 as a replacement image, e.g., by image selection module 160, as described in greater detail in conjunction with FIG. 6.

Next, the process managing power (e.g., browser 125) replaces 345 the identified plug-in with the still image selected 340 via the separate process, e.g., by mode based UI configuration module 155 to update the web page displayed to include the still image, rather than the video (or other content) of the plug-in. Not allowing the plug-in 435 to continue running (e.g., preventing the plug-in from running, suspending the plug-in, or otherwise stopping the plug-in) saves the computing device 100 significant computational power and battery life.

Figure 5B:
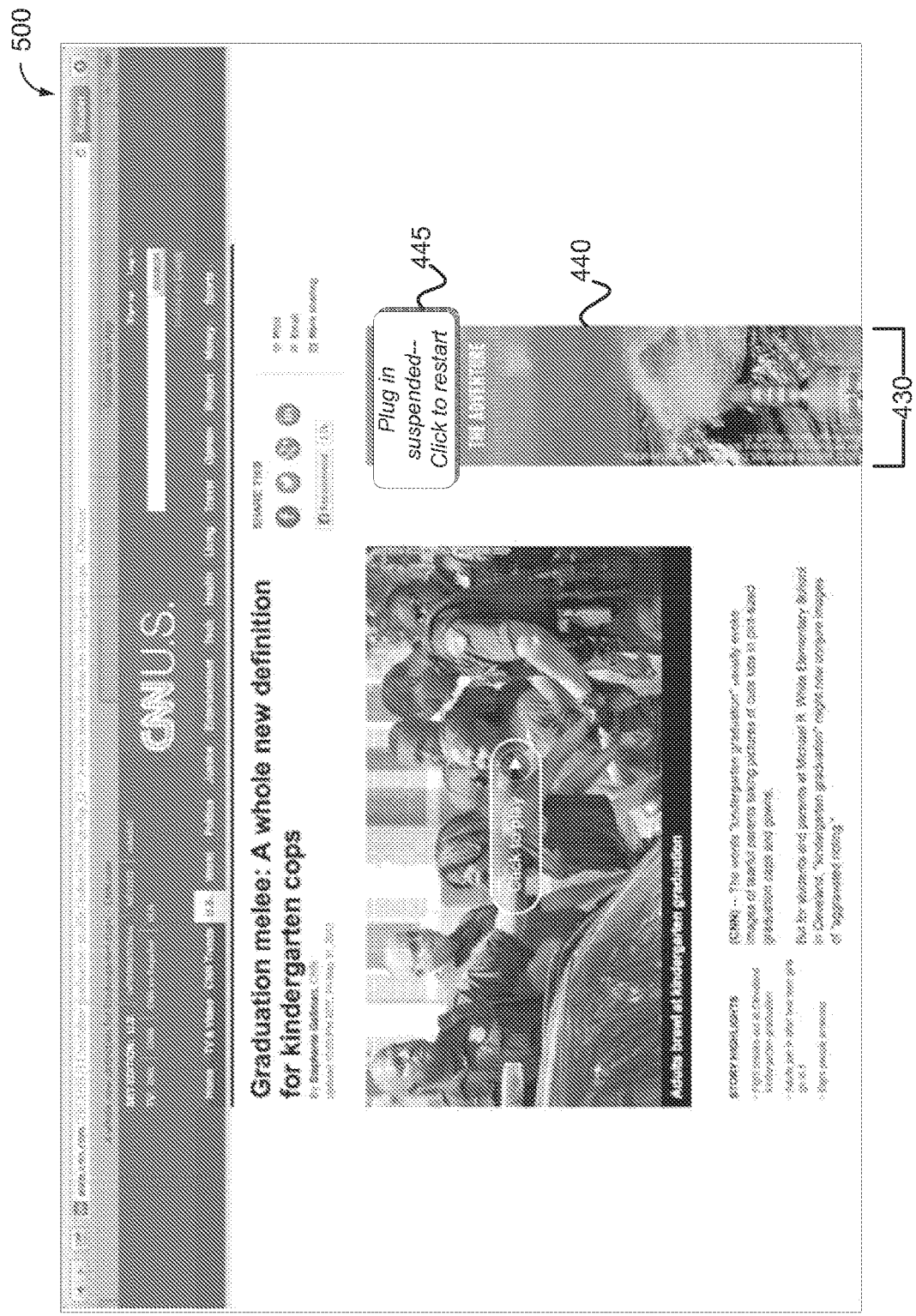

Referring now to FIG. 5A, a web page 500 is shown, in which the plug-in 435 has been replaced by a still image 440 corresponding to the plug-in 435 per the replacement step 345 above. If the user hovers over the still image 440, or a corresponding action on a touch screen such as holding a touch stationary over the still image 440, a notification 445 appears, as shown in FIG. 5B as "Plug-in suspended-Click to restart." If the user directs a selection or touch action at the static replacement image 440, reloading plug-ins on the web page that are of the same type.

This processes pertains to media plug-ins, such as those including video, audio, or some combination including video or other visual components. For plug-in types without a visual component, the power reduction processes (browser-based or other process-controlled throttling) described below in conjunction with FIGS. 8-11 can be applied (e.g., reduced updating, suspending, etc.) instead of the power saving procedure 330 discussed above.

Returning to FIG. 3, if at a later time, as represented by the break in the arrow between steps 345 and 350, browser 125 (or process) receives 350 a user action related to plug-in, the browser 125 (or process) determines 355 whether the action is a reload type of action. Reload types of actions include, according to various embodiments, a click on the still image 440 or the notification 445, or other action indicating the user wants to re-load the plug-in 435. If the action is a reload type, the browser 125 (or process) reloads 360 the plug-in, e.g., by the mode based user interface configuration module 155 reconfiguring the page for rendering.

If the action is not a reload type, such as resizing of the plug-in 435, or clicking on a different still image 440 corresponding to a power saved plug-in on the page, the process returns to step 320 to check whether the corresponding plug-in 435 meets any further power saving rule. In this example, the rules are those described above in conjunction with step 320, or optionally related to the user action of step 350, e.g., for a resize action, the rule in some circumstances is whether the plug-in 435 has been resized to exceed the aforementioned maximum size threshold (thereby indicating to the browser or process to not power save the plug-in any further). For an action corresponding to reloading a different plug-in 435 on the page, the rule in some circumstances is whether the plug-in 435 is of the same type and from the same content source, in which case the plug-in 435 is again not power saved. In addition, the browser 125 (or process) optionally runs a double check of the plug-ins 435 on the page to check whether a suspended plug-in 435 corresponds to a main resource portion of the page (such as 410 of FIG. 4) and is of significant size. In this example, the browser 125 (or process) has information for the coordinates of typical main resources on the page (e.g., in the middle section of the page, but not completely at the top), and it can determine if a plug-in is within the area of those coordinates. If a rule does not apply, the plug-in 435 is reloaded 360.

Method Flow: Replacement Image Selection

Figure 6:
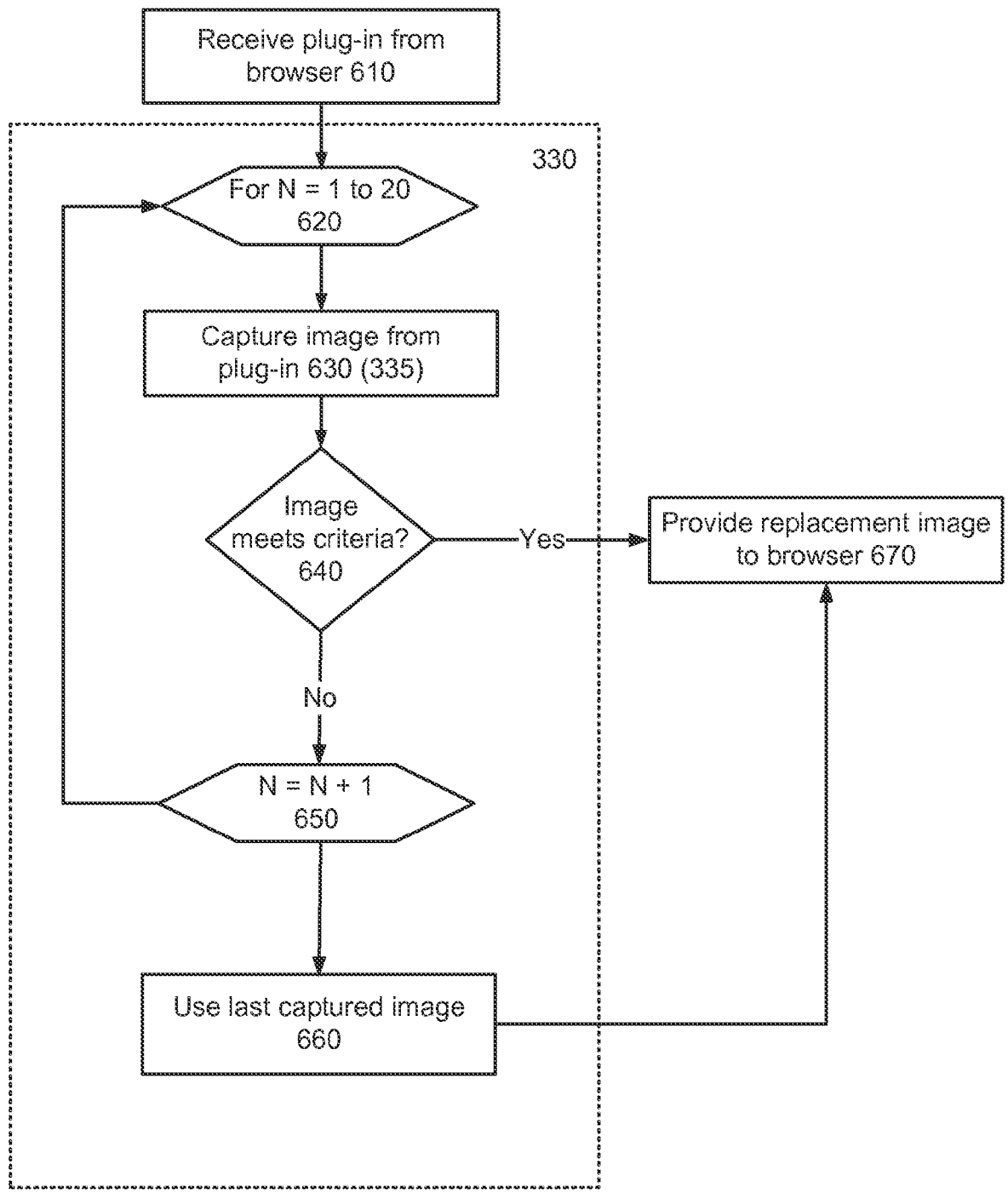
FIG. 6 is a flowchart depicting a method for selecting an image for replacement of a plug-in according to one embodiment.

The power saving procedure 330 beneficially operates to provide a replacement image that will give the user the impression that the plug-in on the web page is operating correctly, and is not broken. This is because if the plug-in was simply stopped without a replacement image, the user might incorrectly infer that the plug-in or page was not operating properly. Referring now to FIG. 6, a flowchart depicts a method for selectively applying a power saving procedure 330 to select an appropriate static image for replacement of the plug-in on the page according to one embodiment. A separate process (thread), e.g., image selection module 160, first receives 605 a plug-in 435 from browser 125 (or process), e.g., as a result of initiation the power saving procedure 330 of FIG. 3.

First, a plug-in selected for power saving is received 610 from browser 125 (or process managing power). A procedural loop 620 begins for processing N images, in this example images 1 through N. One or more images are captured 630 (step 335 of FIG. 3) from the plug-in 435, as described in conjunction with FIG. 3.

Next, the process determines 640 whether the captured image is suitable for displaying as a static replacement image, e.g., according to various criteria. The image is analyzed according to one embodiment by generating a color histogram of the image to detect the colors present in the image. The histogram colors are examined to determine whether 640 the image meets the criteria for use as a still replacement image.

Figure 7:
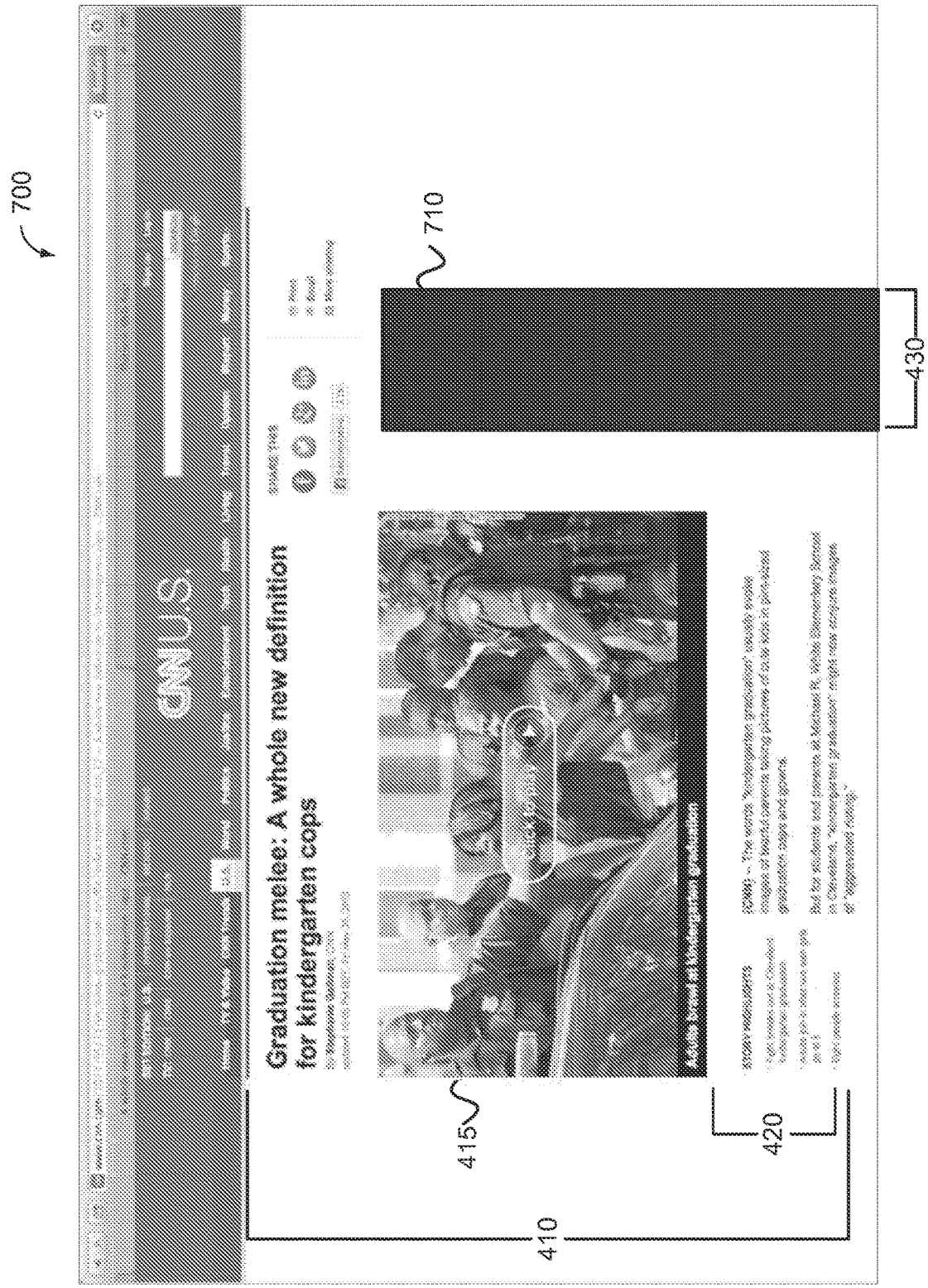
FIG. 7 displays an example GUI in which a plug-in has been replaced by a still image not meeting the criteria to be used as a replacement image according to one embodiment.

The criteria for using the image as a replacement image excludes images that are not representative of the content of plug-in 435, based on the distribution of colors in the histogram. For example, a still image that is all (or substantially, e.g., 98%) black pixels or all (or substantially all) white pixels, or substantially all of one color more generally, is rejected as a candidate replacement image, as they create the impression that the plug-in, or the page, is 'broken.' FIG. 7 shows an example of a web page 700 showing a hypothetical still image 710 not meeting the criteria to be used as a replacement image. In this example, the still image is a moment in time from the video in which the entire image is a single color, e.g., all black. An all black still image does not meet the criteria as described above, since it may confuse the viewer into thinking that the plug-in is 'broken' instead of just stopped.

Returning to FIG. 6, if the image meets the criteria, to the image is selected and is provided 670 to the browser 125 (or process) as the replacement image. If not, the loop increments 650 the number of the candidate image, and the loop continues back to the starting point at step 620. If the maximum number of images has been analyzed (e.g., N=20) and no image has been found that meets the criteria, the last captured image is used 660, and provided 670 to the browser 125 (or process). In addition, to the two scenarios depicted in the figure, i.e., analyzing up to N images until an image is found that meets the criteria (at which point the process stops), or analyzing N images until the process selects the Nth image, two other scenarios are possible for the processes of selecting an image as a replacement. First, in the simplest instance an image can be captured 630 from the plug-in just once, and that image can be provided 670 to the browser 125 (or process) as the replacement image. As noted above, this option runs the risk of the user thinking the plug-in or web page is broken. Alternatively, instead of using a loop corresponding to a number limit for the images captured and analyzed 640, a loop could be used that instead places a temporal limit on the capture and analysis 640 of images, e.g., to capture images for a time duration, t, that can be a predetermined number of seconds (or smaller time increments) after the page is loaded, for example 2 seconds. This numerical or temporal limit on the number of images captured and analyzed places limits on the number of images considered before selection of an image to use as the still image, even if it does not meet the criteria. Considering a number of images may help provide a 'best' image for display as a still image, while having a limit on the number helps avoid using too much processing/power for this step, which when excessive would defeat the goal of reducing power usage.

Power Saving of Background Processes

In addition to the power saving procedures described above related to plug-ins on the primary page, the browser 125 (or process) can provide additional power savings by reducing or suspending processes occurring on non-visible portions of background pages, such as background (not displayed) tabs, minimized web pages, and fully or partially occluded web pages.

In some implementations, operating system level control (power throttling) of processes can reduce or suspend all pages running in a process within the browser application 125 (or browser), and the browser application 125 (or a power management process) can selectively reduce process execution of individual pages. This is because the operating system can determine which processes are running, but does not have information as to which pages have the focus, and what is visible versus occluded on the display. Thus, an operating system lets all processes run in some circumstances, or reduces all processes in others. Because the browser application 125 (or process) has information as which pages are visible/have focus, the browser 125 (or process) can selectively control the execution of the pages not in focus.

Figure 8:
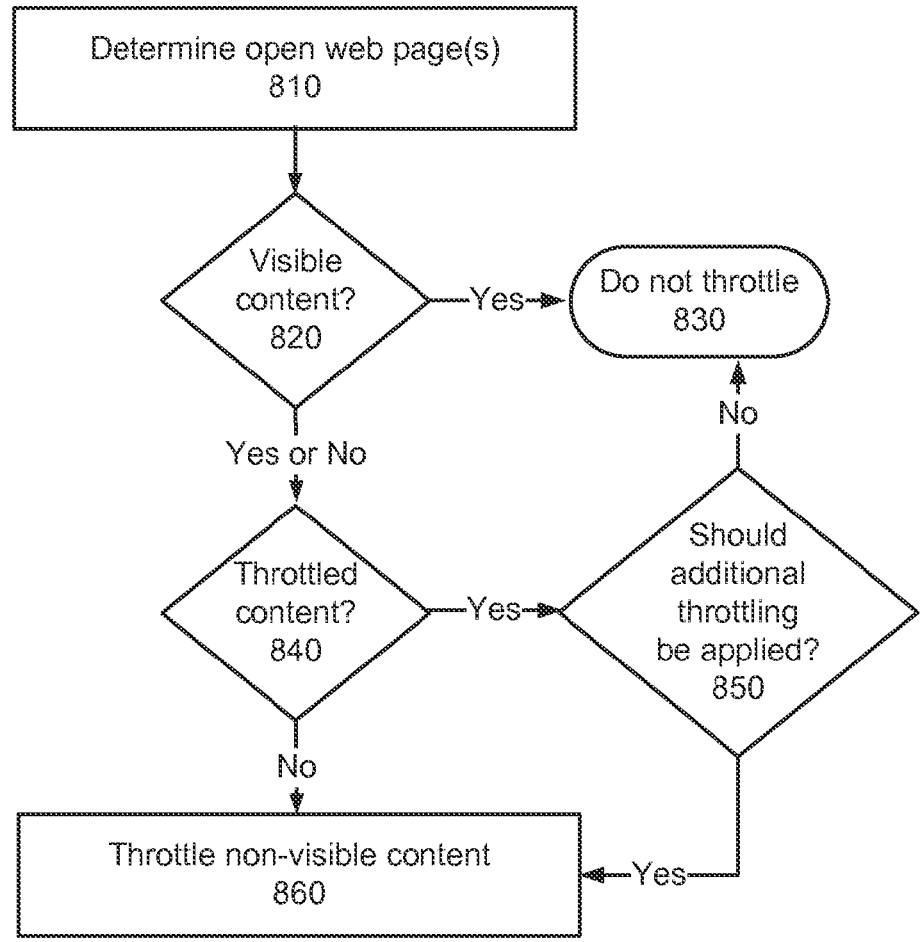
FIG. 8 is a flow chart illustrating a process for identifying and selectively reducing background processes according to one embodiment.

FIG. 8 is a flow chart illustrating a process for identifying and selectively controlling execution of background processes to reduce their power consumption, which is called "throttling" herein, this process is, optionally performed by computing device 105 or one or more programs stored in a non-transitory computer-readable storage medium therein. First, the process that is managing the power (e.g., the web browser 125) determines pages that are open in the browser 125. In other embodiments, the browser 125 (or process associated with the browser) could report the page visibility information to the OS, and the OS could perform the power management. For example, the DOM processing module 135 generates a DOM tree for pages and the rendering module 140 renders the DOM tree. For example, if three different web pages are open, three rendering processes are being used to render the pages: one per page. Alternatively, in some cases multiple pages are running in a single process. For example, it is typical for browser 125 to have the first N pages run in their own process, and the following (N+1, etc.) share a process. Similarly, pages from the same domain are capable of running in the same process. Many other configurations are possible.

Figure 9:
FIG. 9 is a screenshot of an example GUI showing a web page in a background tab according to one embodiment.
Figure 10:
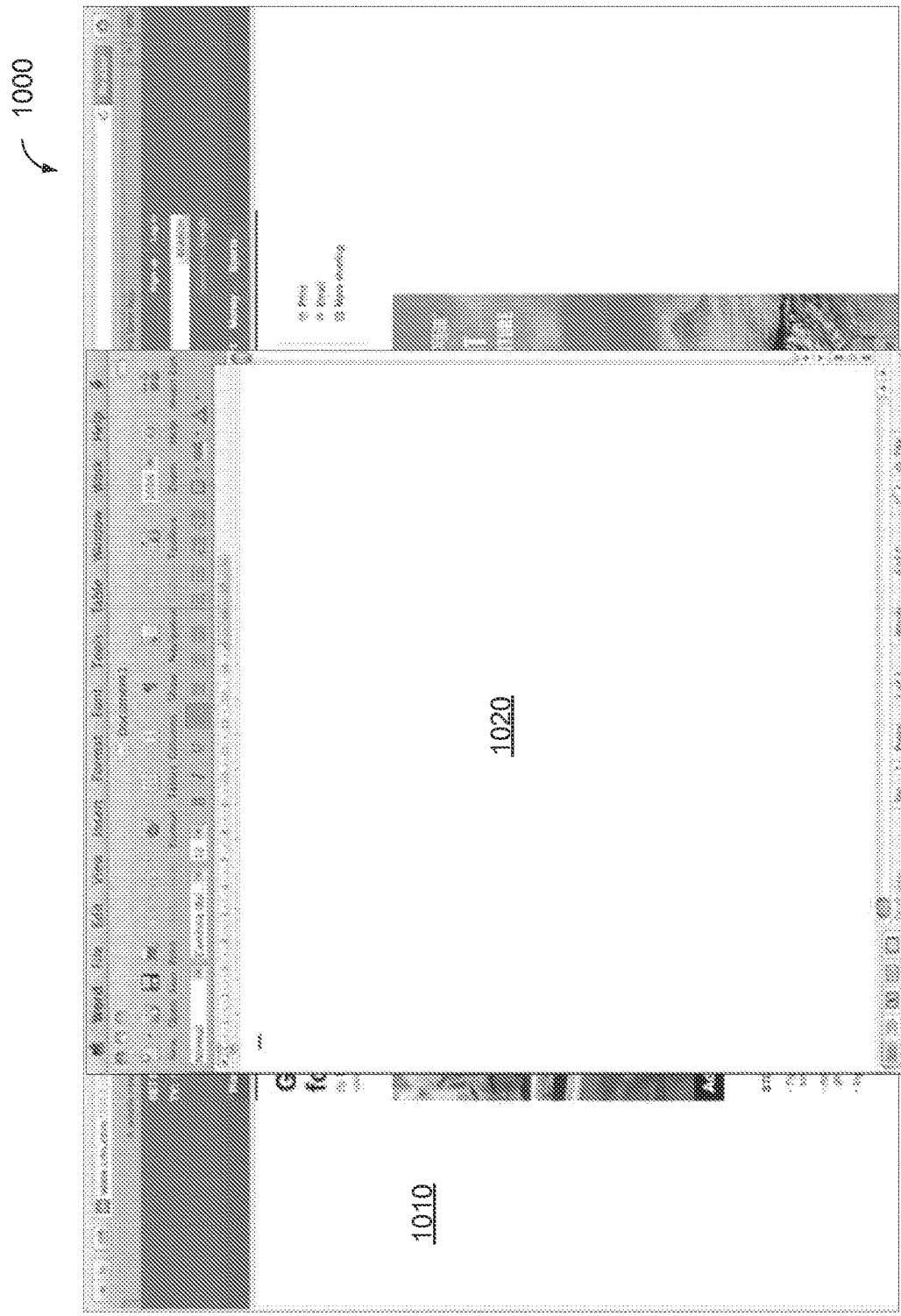
FIG. 10 is an example GUI showing a web page almost entirely occluded by a Word document according to one embodiment.
Figure 11:
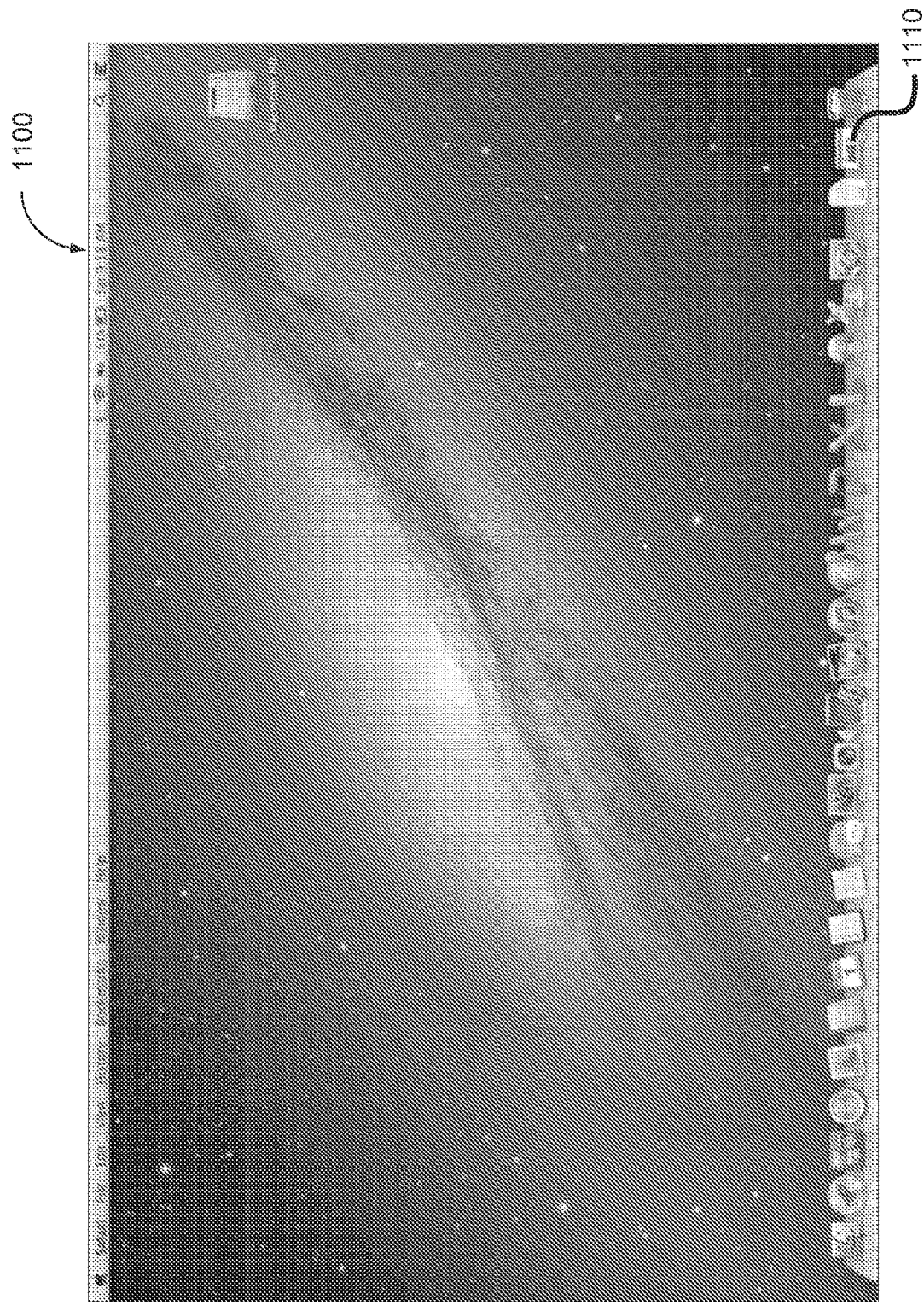
FIG. 11 is an example GUI showing a web page that is minimized according to one embodiment.

The browser 125 (or process) determines 820 whether the content of the page is visible. The browser 125 (or process) tracks the visibility state of the page, which can be set as a non-visible visibility state based on whether a page is in a background tab, the browser window is minimized, or if the content is partially or entirely occluded by another window such that it is not visible. FIG. 9 is a screenshot of a GUI 900 showing an example of a web page in a background tab according to one embodiment. A CNN News web page is in the background, as shown by the title appearing on the background tab 910, with an Apple web page 920 in the front tab. The CNN News web page is not visible in this example, and would be recognized as such by the browser 125 (or process), for example via visibility module 170. FIG. 10 is a screenshot of a GUI 1000 showing an example of a web page 1010 almost entirely occluded by a Word document 1020. Again, most of the CNN News web page 1010 is not visible, which the browser 125 (or process) recognizes in this step. Although the example shown in FIG. 10 shows a Word document application 1020 occluding the web page 1010, it could be any other item on the display that blocks the content of the web page 1010 such that it is entirely or partially occluded. FIG. 11 is a screenshot of a GUI 1100 showing an example of a web page 1110 that is minimized according. The web page 1110 is not visible, which the browser application 125 (or process) recognizes in this step.

If the page is visible, i.e., has a visible visibility state, the process managing the power usage (e.g., browser 125) does not reduce 830 processing for the page to save power. If the web page content is not visible, the browser 125 or process also determines 840 whether the associated process is already being power throttled by the operating system. If the operating system is already power throttling the page, the process (e.g., browser application 125) determines 850 whether additional throttling should be applied to the page via the browser 125 or process. In short, there are four possible scenarios that the process or browser 125 encounters, summarized via TABLE 1 below: visible/not throttled, visible/throttled, non-visible (hidden)/throttled, and non-visible (hidden)/not throttled. Current operating system power throttling state and whether to apply additional power reductions are determined by the throttling module 175 according to one embodiment. In addition, the process or browser 125 in some circumstances decides to apply the following power throttling 860 to visible plug-ins that are not media type plug-ins, as an alternative to the power saver process 330 if FIG. 3 above.

If the content is to be power throttled 860 as a result of these determinations, it can happen at the operating system or browser 125 (or other process) levels. The process or browser 125 can merely pass the throttling message on to the web process associated with the page, which will in turn allow the operating system to throttle back the entire process, reducing power consumption. Or, e.g., if more than one page is running in the process, the process or browser 125 can throttle in two ways: (1) light throttling via reducing the update rate using timers, e.g., timers controlling JavaScript™ and DOM timers, and (2) heavy throttling, by ceasing Cascading Style Sheet (CSS) animation. Throttling of timers means that timers are set to go off less frequently (e.g., producing less frequent update/refresh rates). For example, timers that typically go off three times per second, can be throttled down to go off at a rate of once per second, a reduction of two-thirds the update rate, with resulting power savings. This throttling is merely exemplary, and any other adjustments to timers can be used that increases their minimum duration (e.g., increasing the amount of idle time between when the timers trigger performance of the processes controlled by the timers). Using the examples of JavaScript™ and DOM timers from above, this means that the JavaScript-based action on the page, and the actual content of the page (DOM timers), would be updated once a second instead of three times a second. Throttling related to CSS animation, which is processing-intensive, can stop CSS animation from occurring entirely if additional throttling is desired, in addition to or separately from the use of timers. For example, if a window containing the page is minimized, there is no reason to continue the graphical rendering of images on the page controlled by CSS.

TABLE 1

| Visible, Not Throttled | Visible, Throttled | Hidden, Throttled | Hidden, Not Throttled |
| --- | --- | --- | --- |
| Timer Throttling: NIA Animation: Full speed | Timer Throttling: NIA Animation: Slowed | Timer Throttling: Start timer Animation: Stopped | Timer Throttling: Start timer Animation: Stopped |

TABLE 1 shows the four possible scenarios that the browser 125 (or process) encounters, visible/not throttled, visible/throttled (by the operating system), not visible (hidden)/throttled (by the operating system), and not visible (hidden)/not throttled, and how each is addressed by the browser 125. If a process on the device managing power (e.g., browser 125) determines at step 820 that the web page content is visible, it does not throttle the timers and animations proceed at full speed. If the process (e.g., browser 125) determines at step 820 that the web page content is visible, and determines at step 840 that the content is already throttled/power reduced by the operating system, it does not throttle timers. However, the animations already are slowed because they are being throttled by the operating system. If the process (e.g., browser 125) determines at step 820 that the web page content is not visible, and determines at step 840 that the content is already throttled by the operating system, the process or browser 125 can start the timers at a different rate and/or stop animation, providing power reduction. If the process (or browser 125) determines at step 820 that the web page content is not visible, and determines at step 840 that the content is not already throttled by the operating system, it optionally chooses to throttle content for the page and reduce power usage by either passing throttling information onto the web process associated with the page to allow the operating system to reduce the entire process, or optionally throttle directly at the browser or via the process by starting timers at a different rate and/or stopping animation as described above. As noted above, this scenario lends itself to the special case in which a single process is running multiple pages, one of which is not visible. In that example, the process should not be throttled by the operating system, since another page running in the same process is in fact visible. Additional heuristics optionally apply to decide whether throttling should be applied selectively to certain non-visible page content such as audio.

The processes discussed herein pertain to media plug-ins, such as those including video, audio, or some combination including video or other visual components. While some aspects described apply to the specific visual components (e.g., capturing a snapshot), other aspects described herein are more generally applicable to plug-in types without a visual component (e.g., reduced updating, suspending, etc.).

The disclosure herein has been described in particular detail with respect to one possible embodiment. Those of skill in the art will appreciate that other embodiments are practiced in some circumstances. First, the particular naming of the components and variables, capitalization of terms, the attributes, data structures, or any other programming or structural aspect is not mandatory or significant, and the mechanisms that implement the invention or its features optionally have different names, formats, or protocols. Also, the particular division of functionality between the various system components described herein is merely exemplary, and not mandatory; functions performed by a single system component optionally are performed by multiple components in some circumstances, and functions performed by multiple components optionally are performed by a single component in other circumstances.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the embodiments disclosed herein include process steps and instructions described herein in the form of an algorithm. It should be noted that the process steps and instructions could be embodied in software, firmware or hardware, and when embodied in software, could be downloaded to reside on and be operated from different platforms used by real time network operating systems.

The algorithms and operations presented herein are not inherently related to any particular computer or other apparatus. Various general-purpose systems optionally are used with programs in accordance with the teachings herein, or optionally via construction of more specialized apparatus to perform the required method steps. The required structure for a variety of these systems will be apparent to those of skill in the art, along with equivalent variations. In addition, the present invention is not described with reference to any particular programming language. It is appreciated that a variety of programming languages are used in various circumstances to implement the teachings of the present invention as described herein, and any references to specific languages are provided for invention of enablement and best mode of the present invention.

The embodiments disclosed herein are well suited to a wide variety of computer network systems over numerous topologies. Within this field, the configuration and management of large networks include storage devices and computers that are communicatively coupled to dissimilar computers and storage devices over a network, such as the Internet.

Finally, it should be noted that the language used in the specification has been principally selected for readability and instructional purposes, and were not selected to delineate or circumscribe the inventive subject matter in some circumstances. Accordingly, the disclosure herein is intended to be illustrative, but not limiting, of the scope of the invention, which is set forth in the following claims.

What is claimed is:

1. A method comprising:
   detecting a plurality of web elements including a first web element and a second web element;
   determining respective visibility states corresponding to the plurality of web elements; and
   in response to a determination that a power reduction criterion is satisfied, concurrently:
   slowing an animation included in the first web element while maintaining a timer associated with an update rate of the first web element in response to the first web element having a visible state; and
   ceasing an animation included in the second web element and adjusting a timer associated with an update rate of the second web element in response to the second web element having a non-visible state.

2. The method of claim 1, wherein the respective visibility states correspond to one or more power saving procedures associated with the plurality of web elements.

3. The method of claim 2, wherein the determination that the power reduction criterion is satisfied includes a determination to apply the one or more power saving procedures to the corresponding plurality of web elements.

4. The method of claim 1, wherein the timer associated with the first web element and the timer associated with the second web element are selected from a group of one or more of: a document object model (DOM) timer, a javascript timer, or a CSS animation timer.

5. The method of claim 1, wherein the determination that the power reduction criterion is satisfied includes a throttling state determination.

6. The method of claim 1, wherein the plurality of web elements corresponds to respective plug-ins associated with a web page.

7. The method of claim 6, wherein detecting the plurality of web elements includes parsing the web page in order to identify the respective plug-ins associated with the web page.

8. The method of claim 6, wherein detecting the plurality of web elements is in response to receiving a request to open the web page.

9. The method of claim 1, wherein the plurality of web elements corresponds to respective open web pages.

10. The method of claim 9, wherein determining the respective visibility states comprises determining respective visibility states associated with the open web pages, wherein each of the respective visibility states corresponds to a visible state or a non-visible state.

11. The method of claim 10, further comprising determining that a particular open web page of the respective open web pages is associated with a non-visible state based on one or more of:
    the particular open web page is running in a background tab;
    a web browser running the particular open web page is minimized; or
    the particular open web page is at least partially occluded.

12. The method of claim 1, wherein the determination that the power reduction criterion is satisfied includes a determination to extend a battery life of a device displaying the plurality of web elements.

13. The method of claim 1, wherein the determination that the power reduction criterion is satisfied includes a determination that an amount of power being used by the plurality of web elements exceeds a power usage threshold.

14. An electronic device comprising:
    a display device;
    one or more processors;
    a non-transitory memory; and
    one or more programs stored in the non-transitory memory and configured to be executed by the one or more processors, the one or more programs including instructions for:
    detecting a plurality of web elements including a first web element and a second web element;
    determining respective visibility states corresponding to the plurality of web elements; and
    in response to a determination that a power reduction criterion is satisfied, concurrently:
    slowing an animation included in the first web element while maintaining a timer associated with an update rate of the first web element in response to the first web element having a visible state; and
    ceasing an animation included in the second web element and adjusting a timer associated with an update rate of the second web element in response to the second web element having a non-visible state.

15. The electronic device of claim 14, wherein the respective visibility states correspond to one or more power saving procedures associated with the plurality of web elements.

16. The electronic device of claim 15, wherein the determination that the power reduction criterion is satisfied includes a determination to apply the one or more power saving procedures to the corresponding plurality of web elements.

17. The electronic device of claim 14, wherein the timer associated with the first web element and the timer associated with the second web element are selected from a group of one or more of: a document object model (DOM) timer, a javascript timer, or a CSS animation timer.

18. The electronic device of claim 14, wherein the determination that the power reduction criterion is satisfied includes a throttling state determination.

19. A non-transitory computer readable storage medium storing one or more programs, the one or more programs comprising instructions, which, when executed by an electronic device with one or more processors and a display device, cause the electronic device to:
detect a plurality of web elements including a first web element and a second web element;
determine respective visibility states corresponding to the plurality of web elements; and
in response to a determination that a power reduction criterion is satisfied, concurrently:
slow an animation included in the first web element while maintaining a timer associated with an update rate of the first web element in response to the first web element having a visible state; and
cease an animation included in the second web element and adjusting a timer associated with an update rate of the second web element in response to the second web element having a non-visible state.

20. The non-transitory computer readable storage medium of claim 19, wherein the respective visibility states correspond to one or more power saving procedures associated with the plurality of web elements.

21. The non-transitory computer readable storage medium of claim 20, wherein the determination that the power reduction criterion is satisfied includes a determination to apply the one or more power saving procedures to the corresponding plurality of web elements.

22. The non-transitory computer readable storage medium of claim 19, wherein the timer associated with the first web element and the timer associated with the second web element are selected from a group of one or more of: a document object model (DOM) timer, a javascript timer, or a CSS animation timer.

* * * * *